Patented May 30, 1944

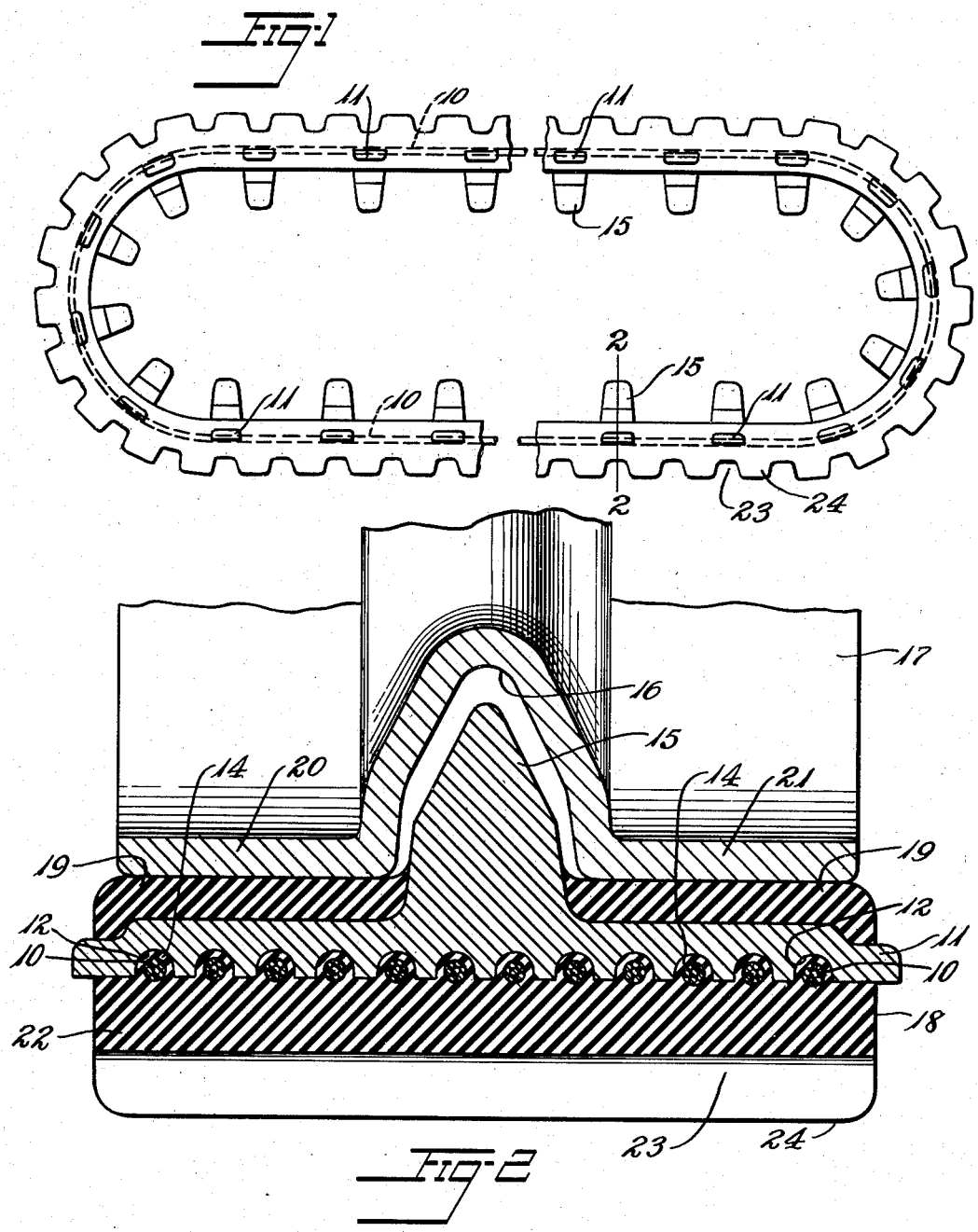

2,350,076

UNITED STATES PATENT OFFICE 2,350,076

TRACK FOR VEHICLES

Kimball D. Smith and Robert Mayne, Akron, Ohio, assignors to The B. F. Goodrich Company, New York, N. Y., a corporation of New York Application January 30, 1942, Serial No. 428,884

6 Claims. (Cl. 305—10)

This invention relates to track for self-laying track type vehicles.

The principal objects of the invention are to provide a track construction of utmost simplicity and having a minimum number of parts, and to provide at the same time for guiding and driving the same effectively.

More specific objects are to provide in a track having a resilient body and flexible tension elements a series of cross members, each an integral piece and serving both for guiding the track on wheels and for bracing the track against transverse flexure, as well as for spacing the tension elements, and to provide for driving the track by frictional engagement of a driving wheel so that no interengaging members are necessary.

These and other objects will appear from the following description and the accompanying drawing.

Of the drawing,

Fig. 1 is a side elevation of a track constructed in accordance with and embodying the invention, parts being broken away.

Fig. 2 is a cross-sectional view thereof taken on line 2—2 of Fig. 1, a driving wheel, also shown in section, being associated with the track.

In accordance with the invention an endless band of laterally spaced-apart and longitudinally extending tension elements, preferably metallic cable, are held in the spaced-apart relation by a plurality of combined spacing and guiding bars spaced-apart longitudinally of the track, the bars being spaced from the cables and bonded thereto by a layer of rubber-like cushion material, and the metal parts are enclosed by a body of rubber or other rubber-like material. Guiding lugs which project from the band guiding the track, are integral with the cross bars.

Referring to the drawing, the numeral 10 designates an endless band of metallic cables arranged in spaced-apart relation and preferably formed by winding a single cable in spaced-apart side-by-side convolutions. The cables are held in proper spaced relation at intervals along the track by spacing bars 11 of metal. These bars, which may be forged, machined, stamped from sheet metal or otherwise suitably formed as an integral unit, are formed on one face with grooves 12, of half-round cross-section, or somewhat deeper, and of greater cross-sectional dimensions than the cables seated therein to provide a cushion 14 of rubber-like material between the bars and the cables. Each bar is provided at its center on the side opposite the spacing grooves with a guiding lug 15 of pyramidal form. The lugs 15 are adapted to engage in a medial clearance groove 16 of a driving pulley wheel 17 and in guiding wheels contacting the track.

The metal parts are enclosed by a solid body 18 of rubber-like material such as soft vulcanized rubber which provides a cushioning layer 19 on the inside of the track for engaging the tread surfaces 20, 21 of the driving and guiding wheels at each side of the guiding groove 16, and also provides a tread layer 22 on the outside of the track for contact with the ground. The tread material may be grooved in any desired manner to provide traction with the ground as by grooves 23 extending crosswise of its tread face in spaced-apart relation and providing cross ribs or cleats 24 therebetween.

In forming the track, the cable and the cross bars are first treated so as to bond to the rubber-like material, preferably by providing them with a coating of rubber adherent metal such as brass, by electro-deposit, and then coating them with rubber cement. In order to prevent hydrogenation of the metal during the plating operation, the metal parts may first be coated with tin by hot dipping.

The treated cable is then covered with a layer of rubber-like cushioning material as by passing it through the insulating head of an extruding machine and there extruding a layer of rubber-like material thereabout, or by winding it with cushion material in tape form.

The cross bars may be temporarily supported in proper spaced-apart relation as by affixing them about a drum, and the covered cable may be wound about the drum in the grooves of the cross bars which face outwardly.

Rubber-like material for forming the body 18 may then be applied in strip form and rolled or pressed in place. The track may then be molded under heat and pressure. The cross bars 11 may be permitted to extend beyond the body 18 at the sides of the track to engage positioning notches formed in the mold so as to locate properly the bars with respect to the material of the body. These projecting portions may be utilized for the attachment of grousers, if desired. Optionally, the ends of the cross bars 11 may be hidden in the body 18, in which case the projecting lugs 15 may be utilized to assist in locating the cross bars properly.

The cables need not be clamped to the cross bars but may float somewhat with relation thereto by virtue of the intervening cushion of rubber thereby contributing to self-adjustment for equalization of the driving load on the cables.

The lugs 15 arranged in spaced-apart relation act to guide the track and brace the same against objectionable lateral tilting. The driving load is transmitted by friction between the driving wheel and the track, suitable tension devices on the wheel being preferably provided to facilitate this, and no driving sprockets are necessary. The bars and lugs, being of integral construction, may be simply and ruggedly built, and the advantages of the flexible tension elements and rubber body may be availed of with an economy of materials, and reliability of operation is nevertheless provided.

Variations may be made without departing from the scope of the invention as it is defined by the following claims.

We claim:

1. A track for a self-laying track type vehicle, said track comprising a body of rubber-like material, cross members embedded in said body intermediate the driving and tread faces thereof and disposed in spaced-apart relation along the track, said members having guiding lugs integral therewith and projecting from the driving face of the track through said body for cooperation with the wheels of the vehicle and said members having notches therein open toward the tread face of the track, and longitudinally extending flexible tension members disposed in said notches at the tread side of the cross members and separated from said members by the rubber-like material, said tension members being separated from the tread face of said body only by said rubber-like material.

2. A track as defined in claim 1 in which said lugs are disposed centrally of the track for cooperation with central grooves in the vehicle wheels and the portions of the rubber-like material laterally adjacent the lugs provide driving faces for frictional engagement with a driving wheel.

3. A track for a self-laying track type vehicle having a peripherally grooved wheel, said track comprising a band of laterally spaced-apart flexible tension elements, cross bars at the wheel side only of the band secured to said elements and separated therefrom by rubber-like material, a body of rubber-like material about said band and cross bars providing cushioned tread and driving faces, and guide lugs on said bars and extending through said body at the driving face thereof for cooperation with the peripheral groove of the wheel.

4. A track for a self-laying track type vehicle, said track comprising a band of longitudinally extending flexible tension elements spaced laterally from each other, a body of resilient rubber-like material surrounding said tension elements, and cross-bars of stiff material at the wheel side only of said band and resiliently secured to said elements through said rubber-like material.

5. A track for a self-laying track type vehicle having a track engaging wheel, said track comprising a band of longitudinally extending flexible tension elements spaced laterally from each other, a body of resilient rubber-like material surrounding said tension elements, and cross-bars of stiff material at the wheel face only of said band, said bars being resiliently secured to said elements through said rubber-like material and having wheel-engaging guide lugs on their wheel faces.

6. A track for a self-laying track type vehicle, said track comprising a band of longitudinally extending flexible tension elements spaced laterally from each other, a body of resilient rubber-like material surrounding said tension elements and having a resilient ground-engaging tread at one face and a resilient wheel-engaging surface at the opposite face of the band, and cross-bars of stiff material embedded in said rubber body between the wheel-engaging surface and said band and cushioned from said tension elements by the resilient rubber-like material, the tread side of said band being covered only by the material of the tread, said cross-bars having guide lugs exposed on the wheel-engaging surface of the track.

KIMBALL D. SMITH.
ROBERT MAYNE.